(12) United States Patent
Kang et al.

(10) Patent No.: US 10,007,924 B2
(45) Date of Patent: Jun. 26, 2018

(54) METHOD FOR PROVIDING STAMP SERVICE BASED ON BEACON SIGNAL

(71) Applicant: SK Planet Co., Ltd., Seongnam-si, Gyeonggi-do (KR)

(72) Inventors: Ki Chon Kang, Seoul (KR); Jae Hyung Huh, Seongnam-si (KR); Ji-Hoon Shin, Seoul (KR)

(73) Assignee: SK PLANET CO., LTD., Seongnam-Si (KR)

( * ) Notice: Subject to any disclaimer, the term of this patent is extended or adjusted under 35 U.S.C. 154(b) by 736 days.

(21) Appl. No.: 14/509,863

(22) Filed: Oct. 8, 2014

(65) Prior Publication Data

US 2016/0034943 A1    Feb. 4, 2016

(30) Foreign Application Priority Data

Jul. 30, 2014    (KR) .................. 10-2014-0097546

(51) Int. Cl.
| | | |
|---|---|---|
| *G06Q 30/00* | (2012.01) | |
| *G06Q 30/02* | (2012.01) | |
| *G06Q 20/32* | (2012.01) | |
| *H04W 40/24* | (2009.01) | |
| *G06Q 20/38* | (2012.01) | |

(52) U.S. Cl.
CPC ..... *G06Q 30/0233* (2013.01); *G06Q 20/3224* (2013.01); *G06Q 20/387* (2013.01); *G06Q 30/0238* (2013.01); *H04W 40/244* (2013.01)

(58) Field of Classification Search
None
See application file for complete search history.

(56) References Cited

U.S. PATENT DOCUMENTS

| | | | | |
|---|---|---|---|---|
| 6,725,155 B1* | 4/2004 | Takahashi | ............... | G01C 21/20 701/24 |
| 9,558,503 B2* | 1/2017 | Oh | ........................ | G06Q 20/202 |
| 2001/0037206 A1* | 11/2001 | Falk | ........................ | G06Q 30/02 705/1.1 |
| 2002/0152123 A1* | 10/2002 | Giordano | ............... | G06Q 20/04 705/14.33 |
| 2002/0165009 A1* | 11/2002 | Nohara | ................. | G06Q 20/343 455/558 |
| 2005/0171715 A1* | 8/2005 | Saitoh | ..................... | G06F 21/10 702/82 |
| 2006/0112380 A1* | 5/2006 | Heller | ............... | G06F 17/30551 717/168 |
| 2007/0012759 A1* | 1/2007 | Allarea | .................. | G06Q 20/10 235/379 |

(Continued)

*Primary Examiner* — Matthew T Sittner
(74) *Attorney, Agent, or Firm* — Brinks Gilson & Lione (57) ABSTRACT

A method for providing a service through a stamp service server, includes: receiving user information and beacon information from a user terminal, wherein the user terminal recognizes a beacon signal output from a beacon device and transmits the beacon information contained in the beacon signal; extracting stamp information matching the received user information on a stored database; providing the extracted stamp information to a POS (Point Of Sale) corresponding to the beacon information; receiving stamp saving information or stamp use information from the POS terminal; and generating or updating stamp information matching the user information included in the stamp saving information or the stamp use information.

9 Claims, 5 Drawing Sheets

(56) References Cited

U.S. PATENT DOCUMENTS

| | | | | |
|---|---|---|---|---|
| 2007/0073564 A1* | 3/2007 | Mizuki | ............... | G06Q 10/00 705/6 |
| 2007/0267503 A1* | 11/2007 | Dewan | ............... | G06K 19/04 235/487 |
| 2007/0282677 A1* | 12/2007 | Carpenter | ............ | G06Q 20/02 705/14.3 |
| 2008/0097844 A1* | 4/2008 | Hsu | ................ | G06Q 10/087 705/14.3 |
| 2009/0158271 A1* | 6/2009 | Shima | ................ | G06F 8/61 717/174 |
| 2009/0299836 A1* | 12/2009 | Sachs | ............... | G06Q 30/0241 705/14.4 |
| 2010/0088367 A1* | 4/2010 | Brown | ................ | G06F 8/60 709/203 |
| 2011/0068170 A1* | 3/2011 | Lehman | .............. | G06Q 30/02 235/380 |
| 2011/0103360 A1* | 5/2011 | Ku | .................. | G01S 5/0252 370/338 |
| 2012/0004972 A1* | 1/2012 | Wengrovitz | ........ | G06Q 20/204 705/14.27 |
| 2013/0052949 A1* | 2/2013 | Yang | ................ | H04W 4/008 455/41.1 |
| 2013/0097001 A1* | 4/2013 | Dyor | ................. | G06Q 30/02 705/14.25 |
| 2013/0113936 A1* | 5/2013 | Cohen | ............... | G07B 15/02 348/148 |
| 2014/0188588 A1* | 7/2014 | Kim | ................. | G06Q 30/0226 705/14.27 |
| 2014/0297289 A1* | 10/2014 | Mori | ................. | H04S 7/302 704/275 |
| 2016/0034943 A1* | 2/2016 | Kang | ................ | G06Q 30/0233 705/14.33 |
| 2016/0247197 A1* | 8/2016 | Morse | .............. | G06F 17/30867 |
| 2017/0123758 A1* | 5/2017 | Mori | ................. | G06F 3/167 |

\* cited by examiner

METHOD FOR PROVIDING STAMP SERVICE BASED ON BEACON SIGNAL

CROSS-REFERENCE TO RELATED APPLICATION

This application claims the benefit of Korean Application No. 10-2014-0097546, filed on Jul. 30, 2014, with the Korean Intellectual Property Office, the disclosure of which is incorporated herein by reference.

BACKGROUND OF THE INVENTION

Field of the Invention

The present invention relates to a method for providing a beacon signal-based stamp service and more particularly, to a technique for using a beacon device, which is installed in a store and outputs a beacon signal, a user terminal carried by a user, a POS terminal and a stamp service server which are accessible via a network, to provide a stamp saving and use service to the user terminal.

Description of the Related Art

A stamp service refers to a service where, when a client visits a store and purchases and pays for a particular goods or service, the number of times of purchase is accumulated and, when the accumulated number of times reaches a predetermined number of times, additional benefits such as no charge for the same goods or service are offered to the client. This stamp service is being utilized in various ways in order to entice clients into stores repeatedly. Since it is important to record the number of times of purchase in providing the stamp service, it has been conventionally populated to record the number of times of purchase in a stamp card made of paper or plastics.

In the meantime, with advance in mobile communication technologies and hardware/software of user terminals, services capable of pushing various kinds of contents into user terminals have been provided.

However, such a stamp service has not been implemented through applications of user terminals. In addition, when a separate stamp card is used as conventional, there is an inconvenient procedure of presenting stamp cards to a clerk manually and checking the stamp cards for stamp saving or use.

The above background of the present invention is only provided for easy understandings of the present invention. Therefore, this should not be admitted to accept the related techniques known to those skilled in the art.

SUMMARY OF THE INVENTION

Accordingly, it is an object of the present invention to provide a stamp service server, a POS terminal, a user terminal and a stamp service providing method, which are capable of checking entrance of a user terminal into a store based on beacon signal recognition, displaying relevant information on a POS terminal, performing a stamp saving and use process according to an input from a store manager, and processing the stamp saving and use simply without presentation of a separate stamp card or without exposure of personal information.

To achieve the above object, according to an aspect of the invention, there is provided a stamp service server including: a receiving unit which is adapted to receive user information and beacon information from a user terminal, wherein the user terminal recognizes a beacon signal output from a beacon device and transmits the beacon information contained in the beacon signal; a generating unit which is adapted to receive stamp saving information or stamp use information from a POS (Point Of Sale) terminal and generate or update stamp information matching the user information included in the stamp saving information or the stamp use information; a database unit which is adapted to match and store the stamp information and the user information; and a stamp information providing unit which is adapted to receive the user information and the beacon information from the user terminal, extract the stamp information matching the user information, and provide the extracted stamp information to the POS terminal corresponding to the beacon information.

In one embodiment, the POS terminal is adapted to match and display the stamp information and user information received through the stamp information providing unit, receive a result of input for the user information displayed by a manager of the POS terminal, process stamp saving or stamp use, and transmit the stamp saving information or stamp use information to the stamp service server.

In one embodiment, the stamp service server further includes a notifying unit which is adapted to receive the stamp saving information or stamp use information from the POS terminal and notify the user terminal of the stamp saving information or stamp use information.

In one embodiment, the received beacon information includes information related to the intensity of the beacon signal received in the user terminal. The stamp service server further includes a position estimating unit which is adapted to estimate position information of the user terminal by referring to the information related to the intensity of the beacon signal and position information of the beacon device corresponding to the beacon signal.

In one embodiment, the stamp information providing unit is adapted to provide the position information, along with the stamp information, to the POS terminal. The POS terminal is adapted to check whether the user terminal exists within a predetermined distance from the POS terminal by referring to the received position information, and highlight the user information of the user terminal.

In one embodiment, the stamp service server further includes an installation path providing unit which is adapted to check whether an application for receiving the stamp service is installed in the user terminal when the beacon information is received in the user terminal through the receiving unit, and provide URL information for installation of the application if the application is not installed in the user terminal.

According to another aspect of the invention, there is provided a method for providing a service through a stamp service server, including: receiving user information and beacon information from a user terminal, wherein the user terminal recognizes a beacon signal output from a beacon device and transmits the beacon information contained in the beacon signal; extracting stamp information matching the received user information on a stored database; providing the extracted stamp information to a POS (Point Of Sale) corresponding to the beacon information; receiving stamp saving information or stamp use information from the POS terminal; and generating or updating stamp information matching the user information included in the stamp saving information or the stamp use information.

In one embodiment, the POS terminal is adapted to match and display the received stamp information and user information, receive a result of input for the user information displayed by a manager, process stamp saving or stamp use, and transmit the stamp saving information or stamp use information to the stamp service server.

In one embodiment, the method further includes receiving the stamp saving information or stamp use information from the POS terminal and notifying the user terminal of the stamp saving information or stamp use information.

In one embodiment, the received beacon information includes information related to the intensity of the beacon signal received in the user terminal. The method further includes estimating position information of the user terminal by referring to the information related to the intensity of the beacon signal and position information of the beacon device corresponding to the beacon signal. The act of providing the extracted stamp information includes providing the position information, along with the stamp information, to the POS terminal.

In one embodiment, the POS terminal is adapted to check whether the user terminal exists within a predetermined distance from the POS terminal by referring to the received position information, and highlight the user information of the user terminal.

In one embodiment, the method further includes: checking whether an application for receiving the stamp service is installed in the user terminal after receiving the beacon information; and providing URL information for installation of the application if the application is not installed in the user terminal.

According to another aspect of the invention, there is provided a non-transitory computer-readable storage medium storing a computer program comprising a set of instructions, when executed, arranged to cause a computer to implement the above-described method.

According to another aspect of the invention, there is provided a stamp service system including: a beacon device which is adapted to output a beacon signal containing beacon information; a user terminal which is adapted to recognize the beacon signal and transmit the beacon information and stored user information to a stamp service server; the stamp service server which is adapted to receive the user information and the beacon information from the user terminal, extract the stamp information matching the received user information on a stored database, and provide the extracted stamp information to a POS terminal corresponding to the beacon information; and the POS terminal which is adapted to match and display the stamp information and user information received from the stamp service server, process stamp saving or stamp use according to a result of input by a manager of the POS terminal, and provide the stamp saving information or stamp use information to the stamp service server.

According to the present invention, it is possible to provide a stamp service server, a POS terminal, a user terminal and a stamp service providing method, which are capable of checking entrance of a user terminal into a store based on beacon signal recognition, displaying relevant information on a POS terminal, performing a stamp saving and use process according to an input from a store manager, and processing the stamp saving and use simply without presentation of a separate stamp card or without exposure of personal information.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Terminologies used in the specification are used to explain particular embodiments and are not intended to limit the scope of the invention. In addition unless stated specifically otherwise in the specification, the terminologies used in the specification should be construed to have meanings generally understood by those skilled in the art but should not be construed to have unduly exaggerated or reduced meanings. In addition, even if the terminologies used in the specification are incorrect terminologies in expressing the idea of the present invention, these incorrect terminologies should be replaced with correct terminologies so that those skilled in the art can correctly understand the present invention. Moreover, general terms used in the specification should be construed as defined in the dictionary or according to the context and should not be construed to have unduly reduced meanings.

Hereinafter, preferred embodiments of the present invention will be described in detail with reference to the accompanying drawings so that those skilled in the art can easily practice the preferred embodiments. Throughout the drawings, the same or similar elements are denoted by the same reference numerals and explanation of which will not be repeated for the purpose of brevity of description. In the following detailed description of the present invention, concrete description on related functions or constructions will be omitted if it is deemed that the functions and/or constructions may unnecessarily obscure the gist of the present invention. Accordingly, embodiments described in the specification and elements illustrated in the drawings are illustrative only and do not cover all of the technical ideas of the present invention. It should be, therefore, understood that these embodiments and elements may be replaced with different equivalents and modifications at the point of time of filing the present application.

Figure 1:
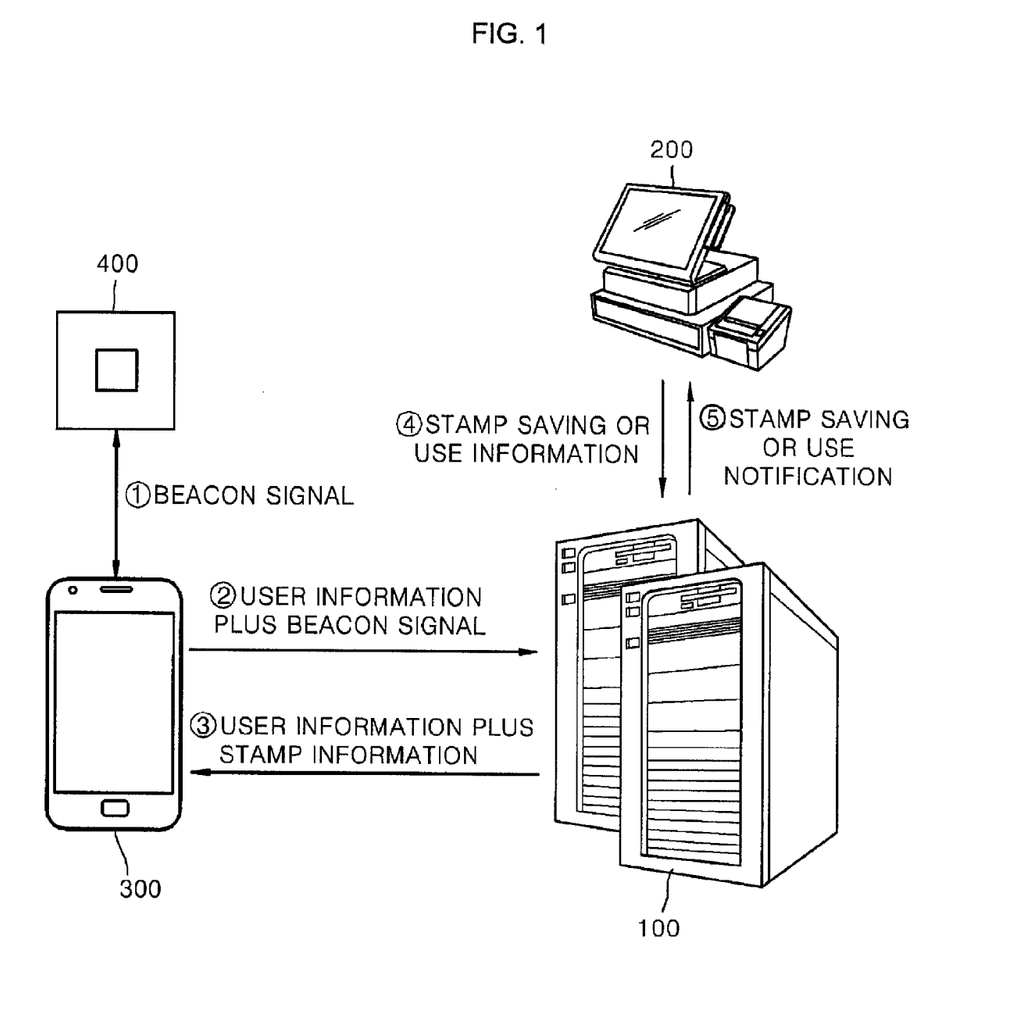
FIG. 1 is a view illustrating various devices of a stamp service system according to one embodiment of the present invention.

FIG. 1 is a view illustrating various devices of a stamp service system according to one embodiment of the present invention.

Referring to FIG. 1, a stamp service system according to one embodiment of the present invention may include a stamp service server 100, a POS terminal 200, a user terminal 300 and a beacon device 400. A stamp service refers to a service where, when a client visits a store and purchases and pays for a particular goods or service, the number of times of purchase is accumulated and, when the accumulated number of times reaches a predetermined number of times, additional benefits such as no charge for the same goods or service are offered to the client. The present invention suggests a stamp service system which is capable of providing a convenient stamp service based on recognition of a beacon signal, application of the user terminal 300, information processing of the stamp service server 100, and operation by a store manager through the POS terminal 200 without presenting a separate stamp card to the store manager.

The beacon service 400 may be located in one or more places in a store. The beacon device 400 can output a beacon signal containing its own identification information (hereinafter referred to as beacon information). The beacon information may include UUID (Unique User Identifier) of the beacon device 400.

The beacon signal may be based on known communication protocols such as Bluetooth, Zigbee, Wi-Fi and the like. In particular, a BLE (Bluetooth Low Energy) signal may be utilized as the beacon signal. The beacon signal output from the beacon device 400 can cover an area of radius of several meters to several tens meters around the beacon device 400.

In implementing the idea of the present invention, there is no need to exchange signals between beacon devices 400. In addition, there is no need for the beacon device 400 to perform two-way communication with the user terminal 300 in addition to outputting the beacon signal and to exchange data with the stamp service server 100 via a separate wired/wireless network.

The user terminal 300 may be implemented with a device known in the art, such as a smart phone, a tablet PC, a PDA (Personal Digital Assistants) or the like, which can be carried by a user and includes a microprocessor and an internal memory for calculation and storage.

The user terminal 300 may include a communication module such as a Bluetooth communication module, which can receive a beacon signal, and may be equipped with at least one application or framework which is provided by the stamp service server 100 or servers of other beacon service companies for stamp service.

When a user who carries the user terminal 300 enters a coverage of the beacon device 400 in a store, the user terminal 300 receives a beacon signal from the beacon device 400. Then, the user terminal 300 executes any application related to a beacon service as a stamp service and transmits beacon information and stored user information to the service server via a network. As used herein, the beacon information which can be recognized through the beacon signal may include identification information of the beacon device 400 (for example, UUID of the beacon device 400) and additionally service-related information which can be received through the beacon signal. As used herein, the user information may include an identification number of the user terminal 300, such as subscription ID or MDN (Mobile Directory Number) of the stamp service.

If the user terminal 300 has a stamp service application, the user terminal 300 can execute the stamp service application after receiving the beacon signal and transmit the beacon information and the user information to the stamp service server 100. Even if the user terminal 300 has no stamp service application, the user terminal 300 can transmit the beacon information and the user information through an IP address of the stamp service server 100, which is contained in the service-related information of the beacon signal.

In the procedure of transmitting the beacon information and the user information after recognizing the beacon signal, the stamp service application is executed in a background so that it cannot be exposed to the user. Thereafter, upon receiving a push message from the stamp service server 100, the stamp service application is executed in a foreground so that contents such as stamp saving or use information contained in the push message can be provided to the user.

The stamp service server 100 communicates with the user terminal 300 and the POS terminal 200 via a network, provides an application related to the stamp service to the user terminal 300, and constructs a relevant database. In addition, the stamp service server 100 stores the identification information of the user terminal 300 in association with stamp information (for example, the number of accumulated stamps, use situation and so on) retained by the user terminal 300 and performs a function of updating the stamp information according to a stamp use and saving process through the POS terminal 200.

Upon receiving the user information and the beacon information from the user terminal 300, the stamp service server 100 extracts stamp information corresponding to the user information from the constructed database and transmits the stamp information and the user information to the POS terminal 200 corresponding to the beacon information. Thereafter, when the stamp saving or use is processed by the POS terminal 200, the stamp service server 100 receives stamp saving information or stamp use information and can update the stamp information corresponding to the user terminal 300. The configuration of the stamp service server 100 will be described in more detail later with reference to FIG. 2.

A POS (Point Of Sale) terminal refers to a device which is installed in a store and processes payment for goods and stamp saving. The POS terminal 200 can communicate with the stamp service server 100 via a network and includes a means for displaying stamp-related information.

According to one embodiment of the present invention, the POS terminal 200 receives the user information and the stamp information from the stamp service server 100, matches and displays the user information and the stamp information, and transmits results of the stamp saving and use to the stamp service server 100 according to an input from a manager (for example, a store clerk). The configuration of the POS terminal 200 will be described in more detail later with reference to FIGS. 3 and 4.

Figure 2:
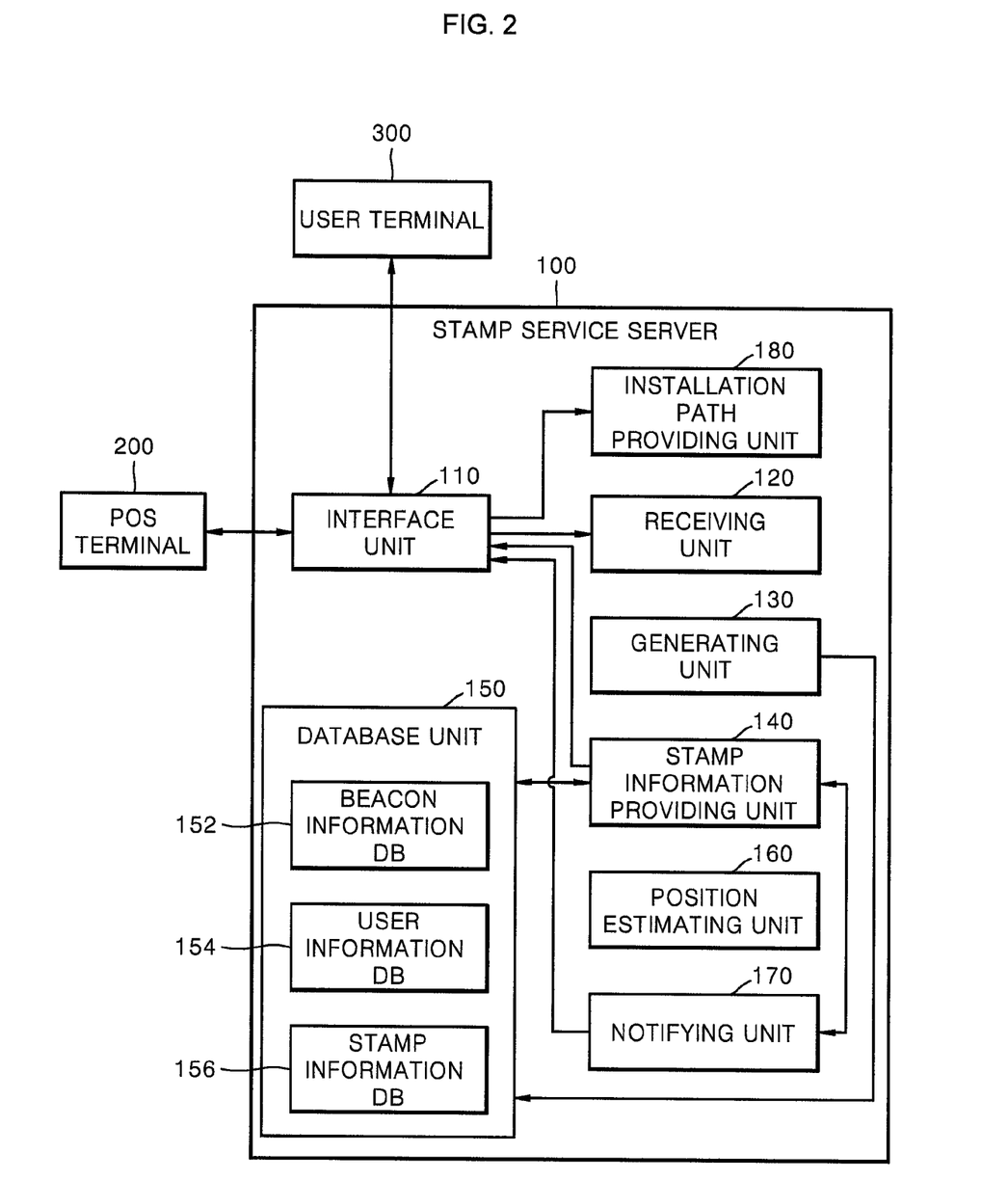
FIG. 2 is a block diagram of a stamp service server according to one embodiment of the present invention

FIG. 2 is a block diagram of the stamp service server 100 according to one embodiment of the present invention.

Referring to FIG. 2, the stamp service server 100 includes an interface unit 110, a receiving unit 120, a generating unit 130, a stamp information providing unit 140, a database unit 150, a position estimating unit 160, a notifying unit 170 and an installation path providing unit 180. In some embodiments, some of the illustrated units may be omitted or replaced with other units without causing any difficulty in implementing the idea of the present invention.

The interface unit 110 is connected to a network and performs a function of exchanging information with the user terminal 300 and the POS terminal. Unless stated specifically otherwise, information is transmitted/received from the receiving unit 120, the stamp information providing unit 140, the notifying unit 170 and the installation path providing unit 180 to the user terminal 300 or the POS terminal 200.

The receiving unit 120 receives the user information and the beacon information from the user terminal 300. As described earlier, the beacon service 400 may be located in one or more places in a store and the beacon signal output by the beacon device 400 may contain the beacon information including UUID (Unique User Identifier) of the beacon device 400. When the user terminal 300 enters the store and receives the beacon signal, the user terminal 300 executes any application related to the beacon service such as the stamp service and transmits the beacon information and the stored user information to the service server via a network.

The database unit 150 stores information related to the stamp service. As illustrated, the database unit 150 includes a beacon information DB 152, a user information DB 154 and a stamp information DB 156. The beacon information DB 152 stores the beacon information of the beacon device 400 installed in the store and the identification information of the POS terminal 200 in the store in association, the user information DB 154 stores identification information of a user who joins in the stamp service and an identification number of the user terminal 300, such as subscription ID or MDN (Mobile Directory Number) of the stamp service, and the stamp information DB 156 stores information related to stamps saved and used by the user in the stored.

When the receiving unit 120 receives the user information and the beacon information from the user terminal 300, the stamp information providing unit 140 extracts the stamp information matching the user information from the stamp information DB 156 of the database unit 150. Then, the stamp information providing unit 140 extracts the identification information of the POS terminal 200 corresponding to the beacon information from the beacon information DB 152 and transmits the extracted stamp information and the user information of the user terminal 300. In this case, if the stamp information corresponding to the user information is not generated in advance, the stamp information may be set to null and transmitted to the POS terminal 200.

The POS terminal 200 matches and displays the user information and the stamp information, processes stamp saving and use according to a manipulation by a manager, and transmits the corresponding stamp saving or use information to the stamp service server 100.

Upon receiving the stamp saving information or stamp use information from the POS terminal 200, the generating unit 130 updates the stamp information matching the user information. That is, for stamp saving processing, the stamp number of the stamp information is incremented. For stamp use processing, the stamp number decremented by the number of used stamps. If the stamp information matching the user information is not stored in advance, new stamp information may be generated in matching with the user information based on the stamp saving information.

The stamp information generated or updated by the generating unit 130 may be stored in the stamp information DB of the database unit 150.

When the stamp information is updated by the generating unit 130, the notifying unit 170 transmits a result of the stamp saving or use to the user terminal 300. In this case, the stamp saving information or the stamp use information can be transmitted, with a push message, to the stamp service application installed in the user terminal 300.

If a plurality of user terminals 300 is located in the store, the corresponding number of user information and stamp information is transmitted to and displayed on the POS terminal 200. In this case, a manager of the POS terminal 200 may be hard to intuitively recognize a user terminal 100 which attempts to save or use a stamp for actual payment.

To solve this problem, in order to check whether or not a user terminal 300 which transmits the beacon information is located in proximity to the POS terminal 200, the stamp service server 100 according to the present invention may further include the location estimating unit 160 for estimating position information of the user terminal 300 based on the beacon signal.

Since the beacon device 400 is fixed in the store and outputs the beacon signal with constant intensity, the intensity of the beacon signal recognized by the user terminal 300 may vary depending on a distance from the user terminal 300 to the beacon device 400. In consideration of this, the beacon device 400 is located in proximity to the POS terminal 200 in the store and the user terminal 300 can transmit information related to the intensity of the beacon signal to the stamp service server 100. In this case, when the user terminal 300 recognizes the beacon signal of the beacon device 400 located in proximity to the POS terminal 200, the position estimating unit 160 can determine that the intensity of the beacon signal is above a preset value and accordingly the user terminal 300 is in proximity to the POS terminal 200.

In another embodiment, a plurality of beacon devices 400 may be installed in the store and the user terminal 300 may receive beacon signals output from the plurality of beacon devices 400. In this case, upon receiving beacon information from the user terminal 300, the position estimating unit 160 can estimate a position of the user terminal 300 in the store using a known method such as triangulation or the like and can determine whether or not the user terminal 300 is in proximity to the POS terminal 200 based on stored position information of the POS terminal 200.

The stamp information providing unit 140 transmits the position information of the user terminal 300 estimated by the position estimating unit 160, along with the stamp information, to the POS terminal 200. The POS terminal 200 can highlight the user information and stamp information of the user terminal 300 existing within a certain distance from the POS terminal 200 by referring to the received position information. Accordingly, the manager of the POS terminal 200 can determine through the highlighted user information that the user terminal 300 is located in proximity to the POS terminal 200, thereby facilitating user check and point saving or use with more ease.

If a stamp service application is installed in the user terminal 300, reception of a push message according to beacon information transmission and stamp saving or use is performed through the stamp service application.

Otherwise, if no stamp service application is installed in the user terminal 300, an IP address of the stamp service server 100 is included in the beacon information and the beacon information and the user information can be transmitted through the IP address. In this manner, if no stamp service application is installed in the user terminal 300, the installation path providing unit 180 can transmit a URL (Uniform Resource Locator) including a stamp service application installation path to the user terminal 300 through SMS (Short Message Service) or the like in order to guide installation of the application.

Figure 3:
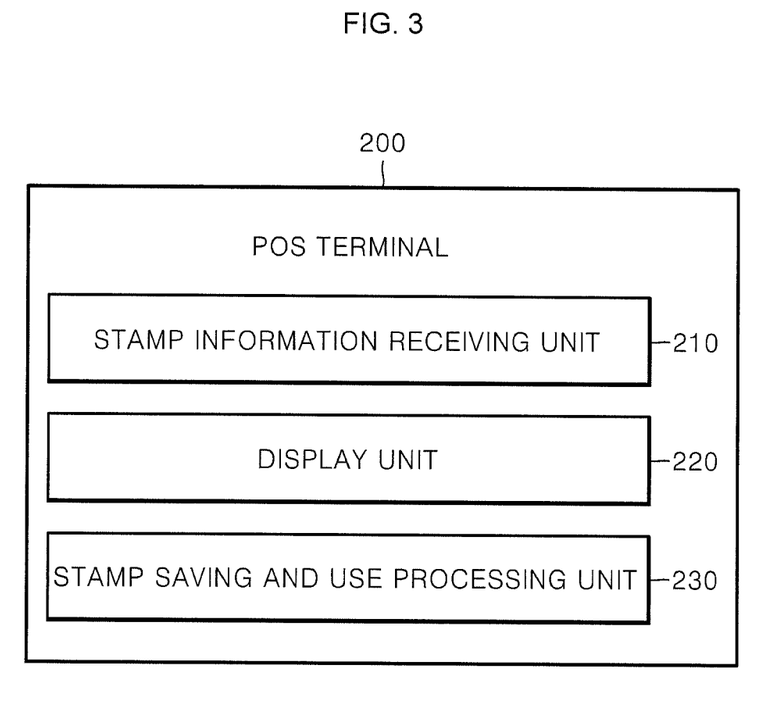
FIG. 3 is a block diagram of a POS terminal according to one embodiment of the present invention.

FIG. 3 is a block diagram of the POS terminal 200 according to one embodiment of the present invention.

Referring to FIG. 3, the POS terminal 200 may include a stamp information receiving unit 210, a display unit 220 and a stamp saving and use processing unit 230. In some embodiments, some of the illustrated units may be omitted or replaced with other units without causing any difficulty in implementing the idea of the present invention.

The POS terminal 200 installed in a store can process the stamp saving and use according to a selection by a manager and exchange information related to the stamp service with the stamp service via a network. Hereinafter, typical configuration and functions of the POS terminal 200 will not be explained but its configuration and functions related to the stamp service according to the idea of the present invention will be explained.

The stamp information receiving unit 210 receives the stamp information including the user information of the user terminal 300 from the stamp service server 100. As described earlier, after receiving the beacon signal from the beacon device 400 installed in the store, the user terminal 300 can transmit the beacon information and the user information to the stamp service server 100. The stamp service server 100 can extract the stamp information matching the user information and transmit the user information and the extracted stamp information to the POS terminal 200.

In addition, the stamp information receiving unit 210 can receive the position information of the user terminal 300 estimated by the stamp service server 100 based on the beacon information.

Figure 4:
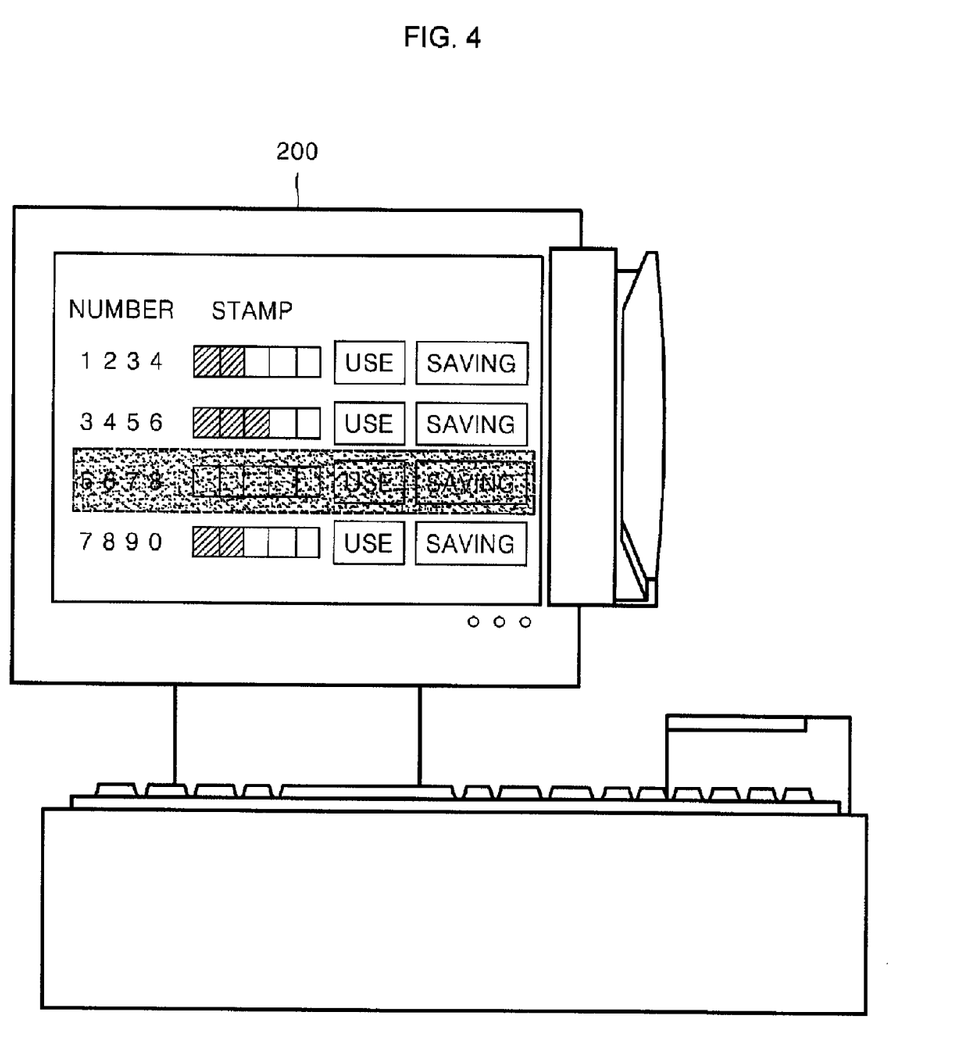
FIG. 4 is a view illustrating user information and stamp information displayed on the POS terminal according to one embodiment of the present invention.

The display unit 220 matches and displays the received stamp information and user information. A display form of the display unit 220 is as illustrated in FIG. 4. If various stamp information is simultaneously or sequentially received, the display unit 220 matches and displays the various stamp information and the user information before the stamp saving or use is processed.

In this case, as illustrated, only later four digits of MDN (Mobile Directory Number) contained in the user information is displayed, the number of stamps retained by a user is indicated, and an icon to allow a manager to select one of saving and use is displayed.

If the position information of the user terminal 300 is also received from the stamp service server 100, the display unit 220 can highlight a user terminal 300 existing within a certain distance from the POS terminal with a shadow or the like, as illustrated.

A manager (for example, a store clerk) of the POS terminal 200 sees the information displayed on the display unit 220, checks the user information through communication with the user, and selects a point saving icon or a point use icon depending on intention of the user.

When the manager selects the point saving icon or the point use icon, the stamp saving and use processing unit 230 processes the stamp saving or the stamp use and transmits the stamp saving information or the stamp use information to the stamp service server 100.

Figure 5:
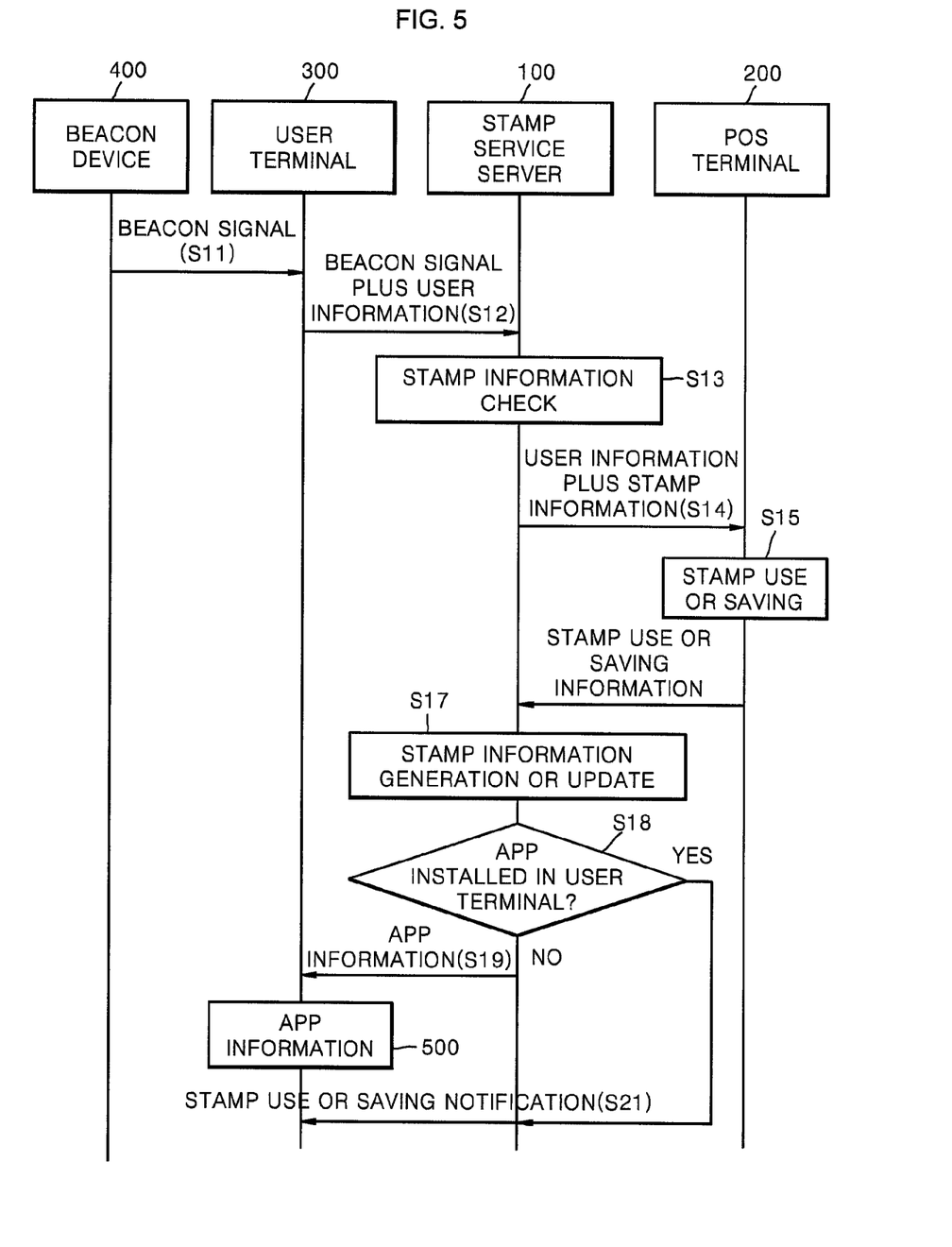
FIG. 5 is a flow diagram of a stamp service providing method according to one embodiment of the present invention.

FIG. 5 is a flow diagram of a stamp service providing method according to one embodiment of the present invention.

Referring to FIG. 5, the stamp service providing method can be performed by the beacon device 400, the user terminal 300, the stamp service server 100 and the POS terminal 200. The technical features described above with reference to FIGS. 1 to 4 will not be explained.

The beacon device 400 outputs a beacon signal containing beacon information (for example, UUID of the beacon device 400) and the user terminal 300 receives the beacon signal when it enters a store in which the beacon device 400 is installed (S11).

The user terminal 300 transmits the beacon information contained in the beacon signal and stored user information to the stamp service server 100 via a network (S12). Here, the user information may include an identification number of the user terminal 300, such as subscription ID or MDN (Mobile Directory Number) of the stamp service.

The stamp service server 100 checks the stamp information matching the received user information on an established database (S13). The stamp service server 100 includes a beacon information DB, a user information DB and a stamp information DB 156. The beacon information DB stores the beacon information of the beacon device 400 installed in the store and the identification information of the POS terminal 200 in the store in association, the user information DB stores identification information of a user who joins in the stamp service and an identification number of the user terminal 300, such as subscription ID or MDN (Mobile Directory Number) of the stamp service, and the stamp information DB stores information related to stamps saved and used by the user in the stored.

The stamp service server 100 provides the extracted (checked) stamp information and the user information to the POS terminal 200 corresponding to the beacon information (S14).

The POS terminal 200 matches and displays the received stamp information and user information. A display form of the stamp information on the POS terminal 200 is as described above with reference to FIG. 4.

When a manager of the POS terminal 200 selects a displayed stamp saving or use icon through communication with the user and processes stamp saving or use (S15), the POS terminal 200 transmits the stamp saving information or stamp use information to the stamp service server 100 (S16).

Upon receiving a result of the processing of the POS terminal 200, the stamp service server 100 generates or updates the stamp information matching the user information on the database (S17).

Thereafter, the stamp service server 100 checks whether or not a stamp service application is installed in the user terminal 300 (S18). If not installed, the stamp service server 100 can transmit URL for application installation to the user terminal 300 through SMS or the like (S19). Thus, the user terminal 300 can install the stamp service application (S20).

If the stamp service application is installed in the user terminal 300, the stamp service server 100 transmits the stamp saving or use information to the user terminal 300 through a push message (S21).

The stamp service providing method according to one embodiment of the present invention may be implemented through computer programs capable of being executed by a variety of computing devices. The computer programs may include program instructions, data files, data structures and so on alone or in combination. Examples of the program instructions may include machine language codes created by a compiler, and high level language codes which can be executed by a computer using an interpreter or the like. The computer programs may be specially designed and configured for the present invention or may be ones which are known and available to those skilled in the art of computer software.

The computer programs executed to perform the above method can be stored in computer-readable non-transitory media. Examples of the media may include hardware devices specialized to store and execute program instructions, including magnetic media such as a hard disk, a floppy disk and a magnetic tape, optical media such as CR-ROM (Compact Disk Read Only Memory) and DVD (Digital Video Disk), magneto-optical media such as a floptical disk or the like, ROM, RAM (Random Access Memory), a flash memory, and so on. These hardware devices may be configured to be operated as one or more software modules to perform the operation of the present invention, and vice versa.

According to the present invention, when it is checked based on beacon signal recognition that a user terminal enters a store, a stamp service server transmits stamp information to a POS terminal and a POS terminal displays the stamp information and processes stamp saving and use through communication with a user. Then, the stamp service server can update the stamp information, thereby providing a stamp service capable of preventing exposure of personal information without presentation of a separate stamp card or direct manipulation of user terminals.

The above description is not intended to limit the present invention to detailed terms set forth herein. While the present invention has been particularly illustrated and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

INDUSTRIAL APPLICABILITY

According to the present invention, it is possible to provide a stamp service wherein, when it is checked based on beacon signal recognition that a user terminal enters a store, a stamp service server can generate and update stamp information according to an input from a manager of a POS terminal, thereby providing a stamp service capable of preventing exposure of personal information without presentation of a separate stamp card or direct manipulation of user terminals. The present invention has industrial applicability since it has sufficient commercial availability and operation performance and can be practiced in reality.

What is claimed is:

1. A stamp service server comprising:
   a receiving unit configured to receive user information and beacon information from a user terminal, wherein the user terminal recognizes a beacon signal output from a beacon device and transmits the beacon information contained in the beacon signal, and wherein the received beacon information comprises information related to an intensity of the beacon signal recognized by the user terminal when the beacon device is located in proximity to a POS (Point Of Sale) terminal;
   a generating unit configured to receive stamp saving information or stamp use information from the POS terminal and generate or update stamp information matching the user information included in the stamp saving information or the stamp use information;
   a database unit configured to match and store the stamp information and the user information;
   a stamp information providing unit configured to receive the user information and the beacon information from the user terminal, extract the stamp information matching the user information, and provide the extracted stamp information to the POS terminal corresponding to the beacon information; and
   a position estimating unit configured to estimate position information of the user terminal by referring to the information related to the intensity of the beacon signal and position information of the beacon device corresponding to the beacon signal,
   wherein the stamp information providing unit is configured to provide the position information, along with the stamp information, to the POS terminal,
   wherein the POS terminal is configured to check whether the user terminal exists within a predetermined distance from the POS terminal by referring to the received position information, and highlight the user information and stamp information of the user terminal existing within the predetermined distance from the POS terminal from one or more of user information and stamp information when the user terminal exists within the predetermined distance from the POS terminal.

2. The stamp service server according to claim 1, wherein the POS terminal is adapted to match and display the stamp information and user information received through the stamp information providing unit, receive a result of input for the user information displayed by a manager of the POS terminal, processes stamp saving or stamp use, and transmit the stamp saving information or stamp use information to the stamp service server.

3. The stamp service server according to claim 1, further comprising a notifying unit which is adapted to receive the stamp saving information or stamp use information from the POS terminal and notify the user terminal of the stamp saving information or stamp use information.

4. The stamp service server according to claim 1, further comprising an installation path providing unit which is adapted to check whether an application for receiving the stamp service is installed in the user terminal when the beacon information is received in the user terminal through the receiving unit, and provide URL information for installation of the application if the application is not installed in the user terminal.

5. A method for providing a service through a stamp service server, comprising:
   receiving user information and beacon information from a user terminal, wherein the user terminal recognizes a beacon signal output from a beacon device and transmits the beacon information contained in the beacon signal, and wherein the received beacon information comprises information related to an intensity of the beacon signal recognized by the user terminal when the beacon device is located in proximity to a POS (Point Of Sale) terminal;
   extracting stamp information matching the received user information on a stored database;
   estimating position information of the user terminal by referring to the information related to the intensity of the beacon signal and position information of the beacon device corresponding to the beacon signal;
   providing the extracted stamp information and the estimated position information of the user terminal to the POS terminal corresponding to the beacon information;
   receiving stamp saving information or stamp use information from the POS terminal; and
   generating or updating stamp information matching the user information included in the stamp saving information or the stamp use information,
   wherein the POS terminal is configured to check whether the user terminal exists within a predetermined distance from the POS terminal by referring to the received position information, and highlight the user information and stamp information of the user terminal existing within the predetermined distance from the POS terminal from one or more of user information and stamp information when the user terminal exists within the predetermined distance from the POS terminal.

6. The method according to claim 5, wherein the POS terminal is adapted to match and display the received stamp information and user information, receive a result of input for the user information displayed by a manager, process stamp saving or stamp use, and transmit the stamp saving information or stamp use information to the stamp service server.

7. The method according to claim 5, further comprising receiving the stamp saving information or stamp use information from the POS terminal and notifying the user terminal of the stamp saving information or stamp use information.

8. The method according to claim 5, further comprising:
checking whether an application for receiving the stamp service is installed in the user terminal after receiving the beacon information; and
providing URL information for installation of the application if the application is not installed in the user terminal.

9. A stamp service system comprising:
a beacon device configured to output a beacon signal containing beacon information;
a user terminal configured to recognize the beacon signal and transmit the beacon information and stored user information to a stamp service server, wherein the received beacon information comprises information related to an intensity of the beacon signal recognized by the user terminal when the beacon device is located in proximity to a POS (Point Of Sale) terminal;

the stamp service server configured to receive the user information and the beacon information from the user terminal, extract the stamp information matching the received user information on a stored database, estimate position information of the user terminal by referring to the information related to the intensity of the beacon signal and position information of the beacon device corresponding to the beacon signal, and provide the extracted stamp information and the estimated position information of the user terminal to the POS terminal corresponding to the beacon information; and the POS terminal configured to match the stamp information and user information received from the stamp service server, check whether the user terminal exists within a predetermined distance from the POS terminal by referring to the received position information, highlight the user information and stamp information of the user terminal existing within the predetermined distance from the POS terminal from one or more of user information and stamp information when the user terminal exists within the predetermined distance from the POS terminal, process stamp saving or stamp use according to a result of input by a manager of the POS terminal, and provide the stamp saving information or stamp use information to the stamp service server.

* * * * *